(12) United States Patent
Mao et al.

(10) Patent No.: US 9,003,008 B2
(45) Date of Patent: Apr. 7, 2015

(54) DOMAIN NAME SYSTEM, INFORMATION PROCESSING METHOD AND APPARATUS OF DOMAIN NAME SYSTEM

(75) Inventors: Wei Mao, Beijing (CN); Xiaodong Li, Beijing (CN); Yan Wang, Beijing (CN); Tao Chen, Beijing (CN); Shuo Shen, Beijing (CN); Liming Wang, Beijing (CN)

(73) Assignee: Computer Network Information Center, Chinese Academy of Science, Beijing (CN)

( * ) Notice: Subject to any disclaimer, the term of this patent is extended or adjusted under 35 U.S.C. 154(b) by 167 days.

(21) Appl. No.: 13/555,016

(22) Filed: Jul. 20, 2012

(65) Prior Publication Data

US 2012/0290701 A1 Nov. 15, 2012

Related U.S. Application Data

(63) Continuation of application No. PCT/CN2010/074572, filed on Jun. 28, 2010.

(30) Foreign Application Priority Data

Jan. 22, 2010 (CN) .......................... 2010 1 0100342

(51) Int. Cl.
*G06F 15/16* (2006.01)
*H04L 29/12* (2006.01)

(52) U.S. Cl.
CPC ................................ *H04L 61/1511* (2013.01)

(58) Field of Classification Search
CPC .................... H01L 61/1511; H01L 29/12066; H01L 61/1541
USPC ........................................ 709/223, 226, 217
See application file for complete search history.

(56) References Cited

U.S. PATENT DOCUMENTS

2007/0233877 A1* 10/2007 Qu et al. ....................... 709/227
2008/0086574 A1* 4/2008 Raciborski et al. ........... 709/245
2008/0140841 A1* 6/2008 Ott ............................... 709/226

FOREIGN PATENT DOCUMENTS

| CN | 1984136 A | 6/2007 |
|---|---|---|
| CN | 101170585 A | 4/2008 |
| CN | 101631133 A | 1/2010 |
| WO | WO2010/002603 A1 | 1/2010 |

OTHER PUBLICATIONS

Chinese First Examination Report of China Application No. 201010100342.2, dated Jun. 4, 2012.
Chinese Second Examination Report of China Application No. 201010100342.2, dated Nov. 5, 2012.
International Search Report of International Application No. PCT/CN2010/074572, dated Nov. 4, 2010.

* cited by examiner

*Primary Examiner* — Ruolei Zong
(74) *Attorney, Agent, or Firm* — J.C. Patents

(57) ABSTRACT

Embodiments of the present invention provide a domain name system as well as an information processing method and apparatus of the domain name system. The information processing method includes: receiving a domain name system query request sent by a recursive server, where the domain name system query request includes identifier information of a terminal device that sends the query request; resolving the received domain name system query request to obtain the identifier information of the terminal device; and exercising query control according to the identifier information of the terminal device. In the domain name system as well as the information processing method and apparatus of the domain name system, the domain name system query request carries the identifier information of the terminal device that sends the query request, and therefore, effective control is exercised on the information query actions of the terminal device in the domain name system.

10 Claims, 5 Drawing Sheets

DOMAIN NAME SYSTEM, INFORMATION PROCESSING METHOD AND APPARATUS OF DOMAIN NAME SYSTEM

CROSS-REFERENCE TO RELATED APPLICATIONS

This application is a continuation of International Application No. PCT/CN2010/074572 filed on Jun. 28, 2010, which claims the priority benefit of Chinese Patent Application No. 201010100342.2, filed on Jan. 22, 2010. The contents of the above identified applications are incorporated herein by reference in their entirety.

FIELD OF THE TECHNOLOGY

The present invention relates to the field of Internet technology, and in particular, to a domain name system as well as an information processing method and apparatus of the domain name system.

BACKGROUND

In the Internet technology, a domain name system provides a service of mapping between a domain name for facilitating memorization and an IP address used by a computer.

A recursive query process in a domain name system in the prior art is: first, a terminal device sends a domain name system (Domain Name System, DNS for short) packet to a recursive server, and then the recursive server queries an authority server A; if the authority server A has relevant records, namely, stores the IP address corresponding to the queried domain name, the authority server A sends the relevant records to the recursive server, and the recursive server sends the relevant records to the terminal device that initiates the query. If the authority server A does not store the IP address corresponding to the queried domain name, and determines that authority server B may probably store the relevant records of the foregoing domain name, authority server A returns an answer recommending the recursive server to query the authority server B. In this way, the recursive server forwards the request for the DNS query to the authority server B. The authority server B performs the same query step as the authority server A. If the authority server B stores the IP address corresponding to the queried domain name, the authority server B sends the relevant records to the recursive server, and the recursive server sends the relevant records to the terminal device that initiates the query; if the authority server B does not store the IP address corresponding to the queried domain name, and determines that an authority server C may probably store the relevant records of the foregoing domain name, the authority server B returns an answer recommending the recursive server to query authority server C. In this way, the recursive server forwards the DNS query request to the authority server C. The foregoing process goes on until an authority server that stores the IP address corresponding to the queried domain name returns the query result to the recursive server, and the recursive server sends the query result to the terminal device that initiates the DNS query. Besides, if none of the authority servers stores the IP address corresponding to the query domain name, the queried authority servers will finally send an answer indicating non-existence of the domain name to the recursive server, and the recursive server returns the answer to the terminal device that initiates the query.

In the foregoing recursive query process, the recursive server queries the IP address corresponding to the domain name in place of the terminal device. Specifically, when the terminal device initiates the DNS query to the recursive server, IP packet header information of the IP packet sent by the terminal device includes the IP address information of the query host itself. As shown in FIG. 1, however, when the recursive server initiates query to the authority server, the IP packet header of the IP packet sent by the recursive server includes the IP address of the recursive server. In the process of developing the present invention, the inventor finds at least these problems in the prior art: without knowing information about the terminal device that queries the domain name information, the prior art is unable to control or statisticize the terminal device's actions of querying the domain name information.

SUMMARY

Embodiments of the present invention provide a domain name system, an information processing method and an apparatus of the domain name system, and a terminal device to control or statisticize information query actions in the domain name system of the terminal device.

An embodiment of the present invention provides an information processing method of a domain name system, including:

receiving a domain name system query request sent by a recursive server, where the domain name system query request includes identifier information of a terminal device that sends the query request;

resolving the received domain name system query request to obtain the identifier information of the terminal device; and exercising query control according to the identifier information of the terminal device.

An embodiment of the present invention provides a terminal device, including:

a message generating module, configured to generate a domain name system query request that includes identifier information of the terminal device; and a sending module, configured to send the domain name system query request to a recursive server.

An embodiment of the present invention provides an information processing apparatus of a domain name system, including:

a receiving module, configured to receive a domain name system query request sent by a recursive server, where the domain name system query request includes identifier information of a terminal device that sends the query request;

an obtaining module, configured to resolve the received domain name system query request to obtain the identifier information of the terminal device; and a control module, configured to exercise query control according to the identifier information of the terminal device.

An embodiment of the present invention provides a domain name system, which includes a terminal device, a recursive server, and at least one authority server, where:

the terminal device is configured to generate a domain name system query request that includes identifier information of the terminal device, and send the query request to the recursive server;

the recursive server is configured to receive the domain name system query request sent by the terminal device, and forward the query request to the authority server; and the authority server is configured to: receive the domain name system query request sent by the recursive server, where the domain name system query request includes the identifier information of the terminal device that sends the query request; resolve the received domain name system query request to obtain the identifier information of the terminal device; and exercise query control according to the identifier information of the terminal device.

In the domain name system as well as the information processing method and apparatus of the domain name system provided by the embodiments of the present invention, the domain name system query request carries the identifier information of the terminal device that sends the query request, and therefore, effective control is exercised on the information query actions in the domain name system of the terminal device.

BRIEF DESCRIPTION OF THE DRAWINGS

To illustrate the technical solutions according to the embodiments of the present invention or in the prior art more clearly, accompanying drawings required for describing the embodiments or the prior art are introduced briefly below. Apparently, the accompanying drawings in the following description merely show some embodiments of the present invention, and persons of ordinary skill in the art may further obtain other drawings according to the accompanying drawings without creative efforts.

DETAILED DESCRIPTION

To make the objectives, technical solutions, and advantages of the embodiments of the present invention clearer, the technical solutions of the present invention will be clearly and completely described hereinafter with reference to the accompanying drawings. Evidently, the described embodiments are merely some embodiments rather than all embodiments of the present invention. All other embodiments obtained by persons of ordinary skill in the art based on the embodiments of the present invention without creative efforts shall fall within the protection scope of the present invention.

Figure 2:
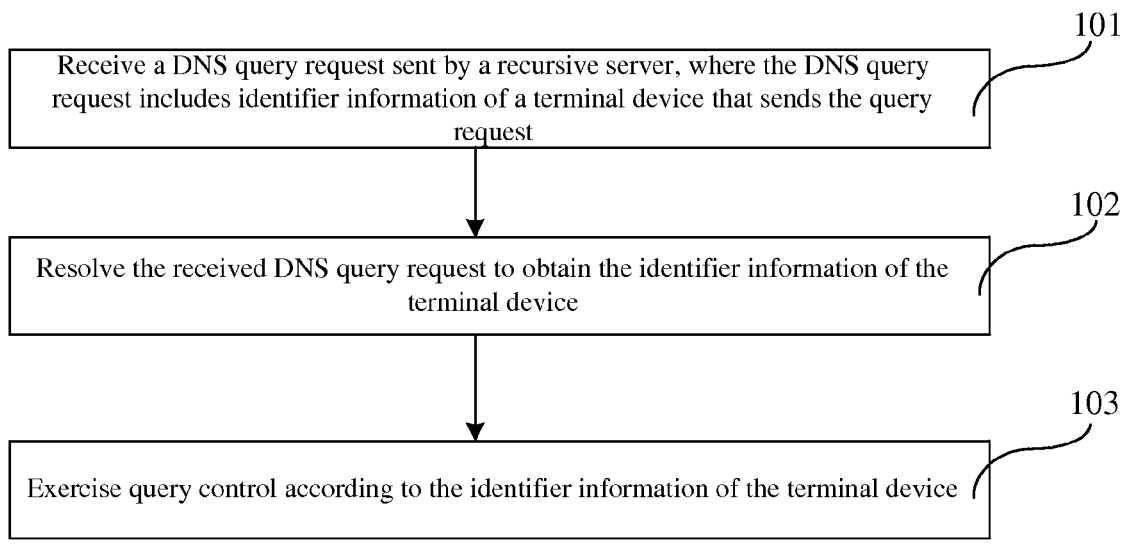
FIG. 2 is a schematic flowchart of an information processing method of a domain name system according to an embodiment of the present invention.

To overcome the defect of the prior art that is unable to control query actions initiated by the terminal device, an embodiment of the present invention provides an information processing method of a domain name system. FIG. 2 is a schematic flowchart of the information processing method of the domain name system according to the embodiment of the present invention. As shown in FIG. 2, the method includes the following steps:

Step 101: Receive a DNS query request sent by a recursive server, where the DNS query request includes identifier information of a terminal device that sends the query request. Specifically, the DNS query request may be a DNS packet sent by the recursive server in the domain name system to an authority server. In this step, the identifier information of the terminal device is added in the DNS query request. After receiving the DNS query request, the recursive server forwards the query request to the authority server. The authority server receives the DNS query request. The identifier information of the terminal device may be carried in the DNS packet header or the DNS packet data information. When forwarding the DNS query request, the recursive server updates only the IP packet header in the query request. Therefore, the identifier information of the terminal device is still retained. The DNS query request received by the authority server in this embodiment may be a request for querying an IP address corresponding to the domain name, or a request for querying a physical address corresponding to the domain name (or IP address).

Step 102: Resolve the received DNS query request to obtain the identifier information of the terminal device. In this step, the authority server obtains the identifier of the terminal device from the DNS query request.

Step 103: Exercise query control according to the identifier information of the terminal device. On the basis of the foregoing steps, the authority server knows the terminal device that sends the query request, and therefore, exercises control on the domain name query action according to subscription information of the terminal device or preset policies.

In the information processing method of the domain name system in the embodiment above, the DNS query request carries the identifier information of the terminal device that sends the query request, and therefore, effective control is exercised on the information query actions of the terminal device in the domain name system.

Figure 1:
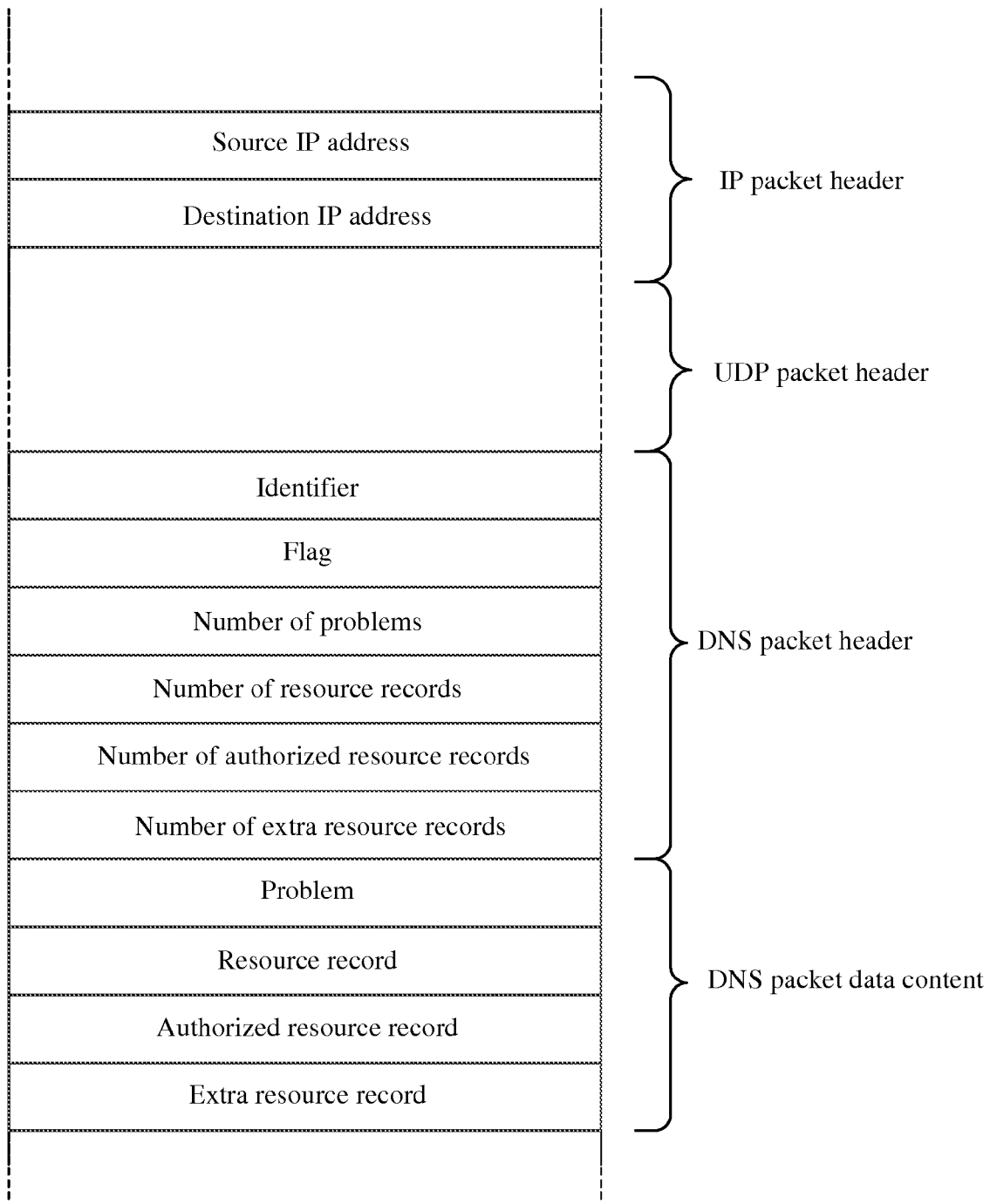
FIG. 1 is a schematic diagram of a data format of a DNS packet in the prior art.

In the foregoing embodiment of the present invention, the identifier information of the terminal device may be set in the DNS packet header or the DNS packet data information. The specific locations of the DNS packet header and the DNS packet data information in the packet are shown in FIG. 1. The foregoing information will never be lost while being forwarded by the recursive server. Therefore, it is ensured that the identifier information of the terminal device is finally transmitted to the authority server.

Figure 3:
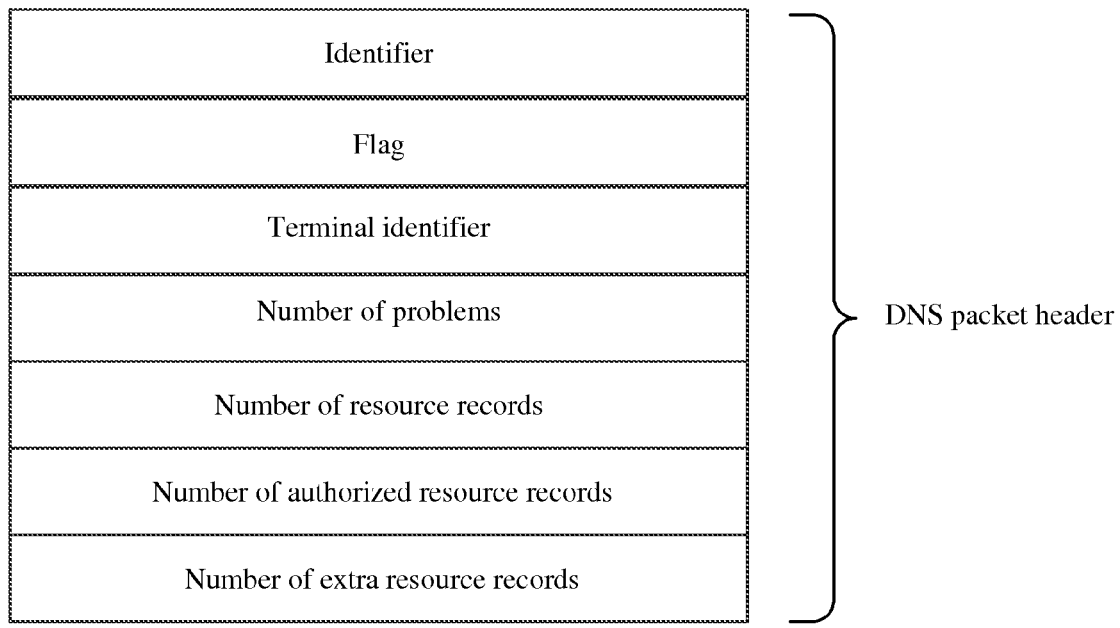
FIG. 3 is a schematic diagram of a data format of a DNS packet header according to an embodiment of the present invention.

In the foregoing embodiment, the identifier information of the terminal device may be added by the terminal device into the packet header of the domain name system or the packet data information of the domain name system at the time of generating the domain name system packet. The details of setting the identifier information of the terminal device into the DNS packet header may be: using the extended DNS packet header to add a new control field, namely, a terminal identifier field. The field is designed to carry the identifier information of the terminal device, for example, information such as IP address or host name. Specifically, as shown in FIG. 3, the DNS packet header not only includes the fields such as identifier, flag, number of problems, number of resource records, number of authorized resource records, and number of extra resource records, but also includes a terminal identifier field.

The details of adding the identifier information of the terminal device into the packet data information of the domain name system may include: adding the identifier information of the terminal device into a resource record of a terminal identifier type; or adding the identifier information of the terminal device into a resource data field of an option-type (namely, OPT type) resource record.

Figure 4:
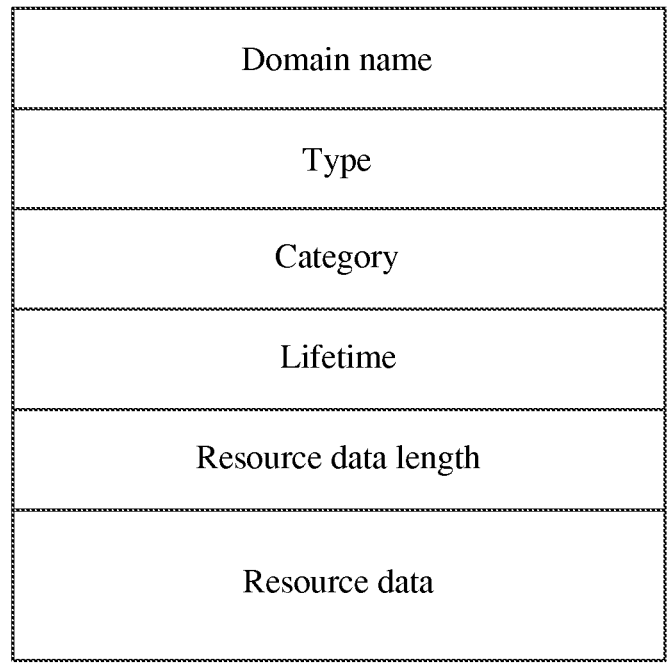
FIG. 4 is a schematic diagram of a data format of a resource record of a terminal identifier type according to an embodiment of the present invention.

The resource record of the terminal identifier type is a newly defined resource record. The resource record specially serves to carry the identifier information of the terminal device, and the newly defined resource record may be placed in the extra resource record part of the DNS packet data content, and transmitted to the authority server. For example, the format of the resource record is shown in FIG. 4. In the type field, a new type value may be used to indicate that the resource record is no other DNS record, but a resource record for carrying the identifier information of the terminal device. Specifically, the identifier information of the terminal device may be set in a domain name field or a resource data field. The newly defined resource record of the terminal identifier type may be placed in the extra resource record part of the DNS packet data content.

Besides, an OPT-type resource record may be defined to extend the DNS. The format of the OPT resource record is shown in FIG. 4. More specifically, the domain name field of the resource record of this type is null, the type field value is 41, and the type field value is the UDP load value of the sender. The format shown in FIG. 5 may be used in the resource data field to carry different option data. In this embodiment, the identifier information of the terminal device may be carried in the option data field of the resource data field, and a new option code type may be defined for the identifier information of the terminal device. Besides, the existing OPT resource record is not suitable for forwarding. Therefore, the OPT-type resource record that carries the identifier information of the terminal device may be configured as a resource record type suitable for forwarding so that the resource record can be transmitted from one hop to another.

Besides, step 103 in the embodiment shown in FIG. 2 may specifically be: exercising control on the query right of the terminal device according to the identifier information of the terminal device, or statisticizing number of times of query initiated by the terminal device according to the identifier information of the terminal device.

In the information processing method of the domain name system in the embodiment above, the identifier information of the terminal device that sends the query request is carried in the DNS query request, and therefore, the authority server knows the terminal device that initiates the query, and exercises effective control on the query actions initiated by the terminal device.

Figure 6:
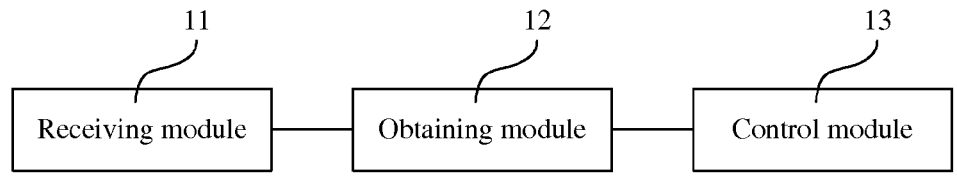
FIG. 6 is a schematic structural diagram of an information processing apparatus of a domain name system according to a first embodiment of the present invention.

Corresponding to the information processing method of the domain name system, an embodiment of the present invention provides a terminal device and an information processing apparatus of the domain name system to perform the procedure provided in the foregoing method embodiment. FIG. 6 is a schematic structural diagram of an information processing apparatus of a domain name system according to a first embodiment of the present invention. The apparatus is equivalent to an authority server. As shown in FIG. 6, the apparatus includes a receiving module 11, an obtaining module 12, and a control module 13. The receiving module 11 is configured to receive a DNS query request sent by a recursive server, where the DNS query request includes identifier information of a terminal device that sends the query request. The obtaining module 12 is configured to resolve the received DNS query request to obtain the identifier information of the terminal device. The control module 13 is configured to exercise query control according to the identifier information of the terminal device.

In the information processing apparatus of the domain name system in this embodiment, the received DNS query request carries the identifier information of the terminal device that sends the query request, and therefore, it is easy to know the terminal device that initiates the query and exercise effective control on the query actions initiated by the terminal device. Besides, the DNS query request received by the receiving module in this embodiment may be a request for querying the IP address corresponding to the domain name, or a request for querying the physical address corresponding to the domain name (or IP address).

Figure 5:
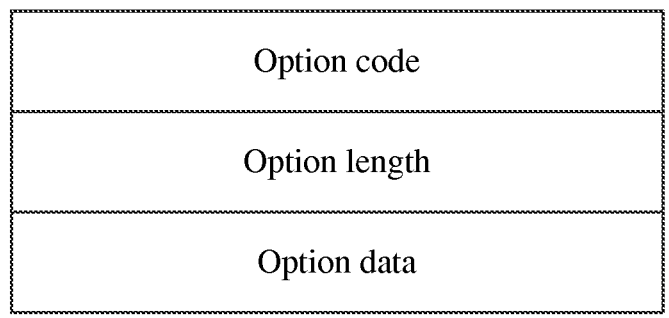
FIG. 5 is a schematic diagram of a data format of a resource data field in an OPT resource record according to an embodiment of the present invention.
Figure 7:
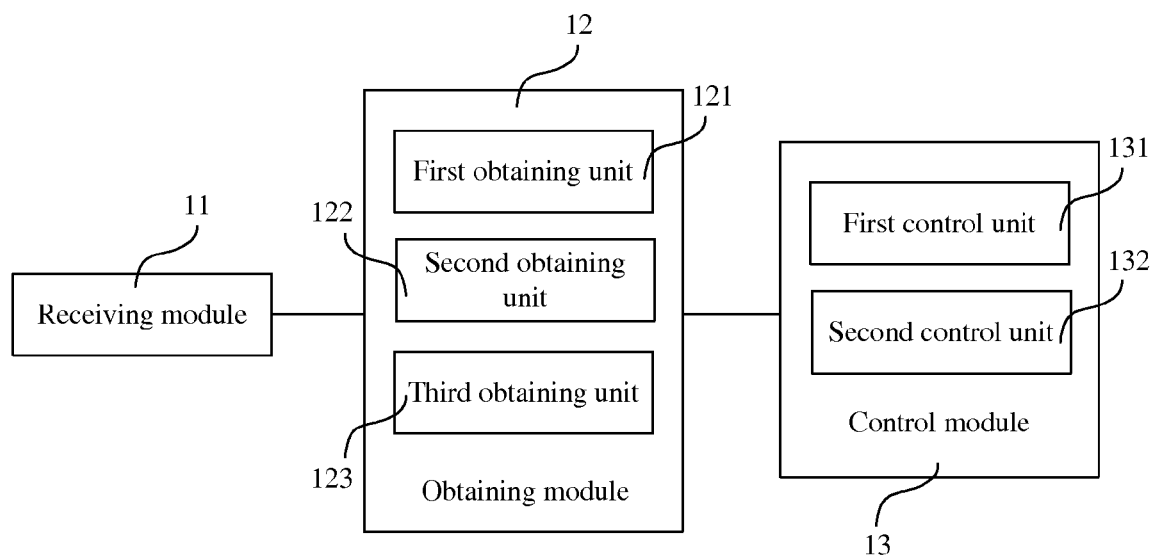
FIG. 7 is a schematic structural diagram of an information processing apparatus of a domain name system according to a second embodiment of the present invention.

In the detailed implementation process, the identifier information of the terminal device may be carried in the packet header of a domain name system packet or the data information of the domain name system packet. As shown in FIG. 7, the obtaining module 12 may include: a first obtaining unit 121, a second obtaining unit 122, or a third obtaining unit 123. The first obtaining unit 121 is configured to resolve the received DNS query request to obtain the identifier information of the terminal device that is carried in a terminal identifier field of the packet header of the domain name system packet, i.e., to obtain the identifier information in the case that the identifier information of the terminal device is carried in the DNS packet header. The second obtaining unit 122 is configured to resolve the received DNS query request to obtain the identifier information of the terminal device that is carried in a resource record of a terminal identifier type, where the resource record of the terminal identifier type may be a resource record type specially defined for carrying the identifier information of the terminal device. The third obtaining unit 123 is configured to resolve the received DNS query request to obtain the identifier information of the terminal device that is carried in a resource data field of an OPT-type resource record, where the OPT-type resource record is a resource record defined by extending the DNS. Specifically, as shown in FIG. 5, the identifier information of the terminal device is obtained from an option data field of the resource data field.

Besides, the control module 13 may further include a first control unit 131 or a second control unit 132. The first control unit 131 is configured to control query rights of the terminal device according to the identifier information of the terminal device. The second control unit 132 is configured to statisticize number of times of query initiated by the terminal device according to the identifier information of the terminal device.

Figure 8:
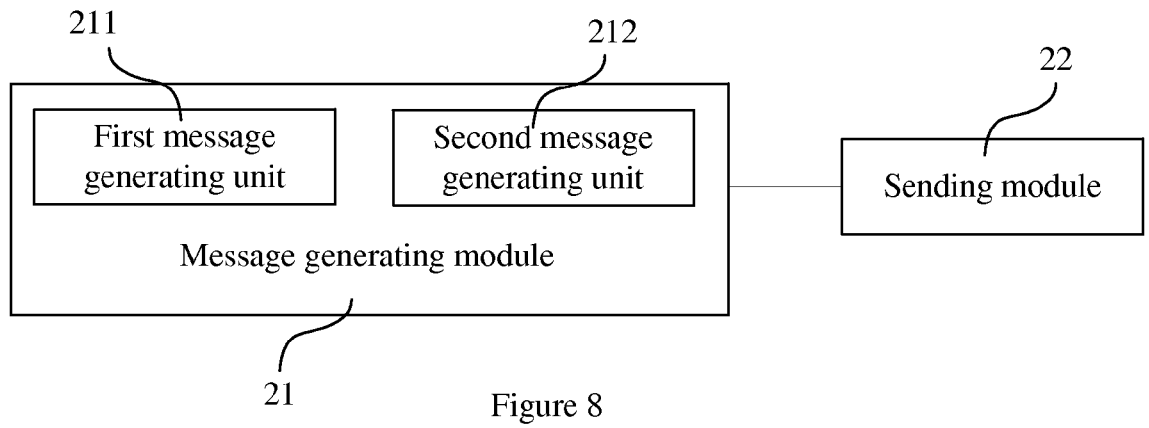
FIG. 8 is a schematic structural diagram of a terminal device according to an embodiment of the present invention.

FIG. 8 is a schematic structural diagram of a terminal device according to an embodiment of the present invention. As shown in FIG. 8, the terminal device includes a message generating module 21 and a sending module 22. The message generating module 21 is configured to generate a DNS query request that includes identifier information of the terminal device. The sending module 22 is configured to send the DNS query request to a recursive server.

Through the terminal device provided in the embodiment above, the message generating module 11 lets the generated DNS query request carry the identifier information of the terminal device to indicate the terminal device that sends the query request. The DNS query request may be forwarded by the recursive server to an authority server. Therefore, the authority server can identify the terminal device that sends the query request and control query actions of the terminal device. The DNS query request may be a request for querying the IP address corresponding to the domain name, or a request for querying the physical address corresponding to the domain name (or IP address).

The identifier information of the terminal device may be carried in a DNS packet, for example, in the packet header of a domain name system packet or the data information of the domain name system packet. That is, the message generating module may further include a first message generating unit 211 or a second message generating unit 212. The first message generating unit 211 is configured to generate the domain name system packet, and add the identifier information of the terminal device into the packet header of the domain name system packet. The second message generating unit 212 is configured to generate the domain name system packet, and add the identifier information of the terminal device into the data information of the domain name system packet. With the identifier information of the terminal device being set in the packet header of the domain name system packet or the data information of the domain name system packet, the foregoing indication information will never be lost while the packet is forwarded by the recursive server, and it is ensured that the identifier information of the terminal device is finally transmitted to the authority server.

Figure 9:
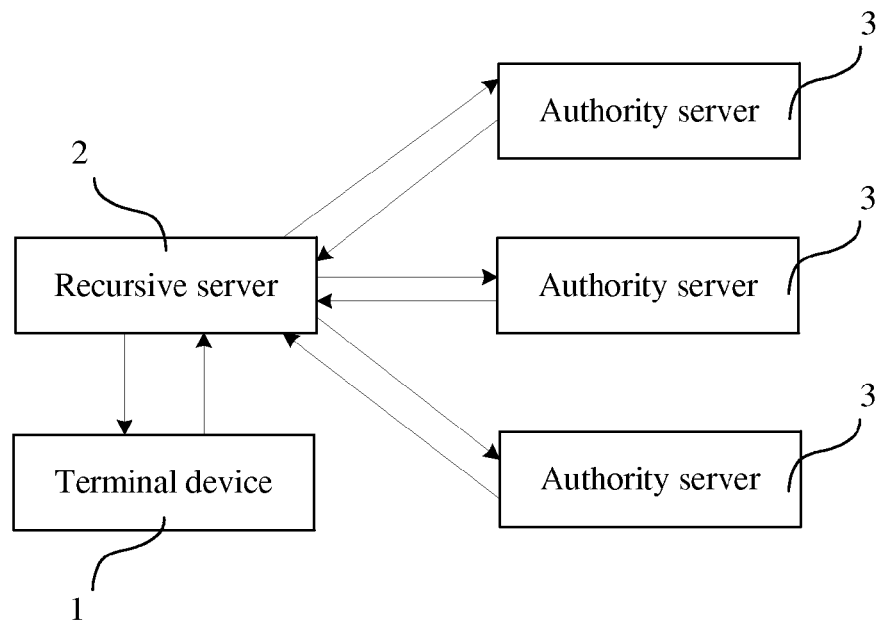
FIG. 9 is a schematic diagram of an apparatus of a domain name system according to an embodiment of the present invention.

A domain name system is provided in an embodiment of the present invention. FIG. 9 is a schematic diagram of an apparatus in the domain name system according to this embodiment. The system executes the procedure provided in the foregoing method embodiment. As shown in FIG. 9, the system includes a terminal device 1, a recursive server 2, and at least one authority server 3. The terminal device 1 is configured to generate a DNS query request that carries the identifier information of the terminal device and send the query request to the recursive server, where the identifier information of the terminal device is added by the terminal device into the DNS query request at the time of generating the request, and specifically, may be added into a DNS packet. The recursive server 2 is configured to receive the DNS query request sent by the terminal device 1, and forward the query request to the authority server 3. The authority server 3 is configured to: receive the DNS query request sent by the recursive server, where the DNS query request includes the identifier information of the terminal device that sends the query request; resolve the received DNS query request to obtain the identifier information of the terminal device; and exercise query control according to the identifier information of the terminal device.

In the domain name system provided in this embodiment, the received DNS query request carries the identifier information of the terminal device that sends the query request, and therefore, it is easy to know the terminal device that initiates the query and exercise effective control on the query actions initiated by the terminal device. The DNS query request received by the authority server in this embodiment may be a request for querying the IP address corresponding to the domain name, or a request for querying the physical address corresponding to the domain name (or IP address).

Through the domain name system, the information processing method and apparatus of the domain name system, and the terminal device in the foregoing embodiments of the present invention, the DNS query request carries the identifier information of the terminal device that sends the query request. Specifically, the identifier information is carried in the packet header of the domain name system packet or in the data information of the domain name system packet. When the identifier information is carried in the data information of the domain name system packet, the identifier information may be carried in a newly defined resource record of a terminal identifier type or in an existing OPT resource record. Anyway, the authority server knows the terminal device that sends the query request to exercise effective control on the information query actions in the domain name system.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as ROM, RAM, magnetic disk, or CD-ROM.

Finally, it should be noted that the embodiments of the present invention are intended for describing the technical solutions of the present invention rather than limiting the present invention. Although the present invention is described in detail with reference to the foregoing embodiments, persons of ordinary skill in the art should understand that they can still make modifications to the technical solutions described in the foregoing embodiments or make substitutions to some technical features thereof, without departing from the spirit or scope of the technical solutions of the embodiments of the present invention.

What is claimed is:

1. An information processing method of a domain name system, comprising:
   receiving a domain name system query request forwarded by a recursive server, wherein the domain name system query request comprises identifier information of a terminal device that sends the query request, and the identifier information of the terminal device is carried in a packet header of a domain name system packet or data information of the domain name system packet, wherein the packet header of the domain name system packet and the data information of the domain name system packet are not updated when the domain name system query request is forwarded by the recursive server;
   resolving the received domain name system query request to obtain the identifier information of the terminal device; and
   exercising query control according to the identifier information of the terminal device;
   wherein the exercising query control according to the identifier information of the terminal device comprises:
   controlling query rights of the terminal device according to the identifier information of the terminal device; or
   statisticizing number of times of query initiated by the terminal device according to the identifier information of the terminal device.

2. The information processing method of the domain name system according to claim 1, wherein:
   the identifier information of the terminal device is carried in a terminal identifier field of the packet header of the domain name system packet.

3. The information processing method of the domain name system according to claim 1, wherein:
   when the identifier information of the terminal device is carried in the data information of the domain name system packet,
   the identifier information of the terminal device is carried in a resource record of a terminal identifier type; or
   the identifier information of the terminal device is carried in a resource data field of an option-type resource record.

4. The information processing method of the domain name system according to claim 2, wherein:
   the identifier information of the terminal device is carried in a domain name field of the resource record of the terminal identifier type or in the resource data field.

5. The information processing method of the domain name system according to claim 2, wherein:

the identifier information of the terminal device is carried in the resource data field of the option-type resource record, and specifically, carried in an option data field of the resource data field, and the option-type resource record that carries the identifier information of the terminal device is configured as a resource record type suitable for forwarding.

6. The information processing method of the domain name system according to claim 1, wherein:
the identifier information of the terminal device is added by the terminal device into the packet header of the domain name system packet or the data information of the domain name system packet at time of generating the domain name system packet.

7. A terminal device, comprising a processor and a non-transitory processor-readable medium having processor-executable instructions stored thereon, the processor-executable instructions comprising a plurality of modules, the modules comprising:
a message generating module, configured to generate a domain name system query request that comprises identifier information of the terminal device; and
a sending module, configured to send the domain name system query request to a recursive server, so that the recursive server forwards the domain name system query request with the identifier information of the terminal device to an authority server for query control;
wherein the message generating module comprises:
a first message generating unit, configured to generate a domain name system packet, and add the identifier information of the terminal device into a packet header of the domain name system packet; or
a second message generating unit, configured to generate the domain name system packet, and add the identifier information of the terminal device into data information of the domain name system packet;
wherein the packet header of the domain name system packet and the data information of the domain name system packet are not updated when the domain name system query request is forwarded by the recursive server.

8. An information processing apparatus of a domain name system, comprising a processor and a non-transitory processor-readable medium having processor-executable instructions stored thereon, the processor-executable instructions comprising a plurality of modules, the modules comprising:
a receiving module, configured to receive a domain name system query request forwarded by a recursive server, wherein the domain name system query request comprises identifier information of a terminal device that sends the query request, and the identifier information of the terminal device is carried in a packet header of a domain name system packet or data information of the domain name system packet, wherein the packet header of the domain name system packet and the data information of the domain name system packet are not updated when the domain name system query request is forwarded by the recursive server;
an obtaining module, configured to resolve the received domain name system query request to obtain the identifier information of the terminal device; and
a control module, configured to exercise query control according to the identifier information of the terminal device;

wherein the control module comprises:
a first control unit, configured to control query rights of the terminal device according to the identifier information of the terminal device; or
a second control unit, configured to statisticize number of times of query initiated by the terminal device according to the identifier information of the terminal device.

9. The information processing apparatus of the domain name system according to claim 8, wherein the obtaining module comprises:
a first obtaining unit, configured to resolve the received domain name system query request to obtain the identifier information of the terminal device that is carried in a terminal identifier field of the packet header of the domain name system packet; or
a second obtaining unit, configured to resolve the received domain name system query request to obtain the identifier information of the terminal device that is carried in a resource record of a terminal identifier type; or
a third obtaining unit, configured to resolve the received domain name system query request to obtain the identifier information of the terminal device that is carried in a resource data field of an option-type resource record.

10. A domain name system, comprising a terminal device, a recursive server, and at least one authority server, wherein:
the terminal device comprises a processor and a non-transitory processor-readable medium having processor-executable instructions stored thereon, the processor-executable instructions comprising a plurality of modules, the modules comprising:
a message generating module, configured to generate a domain name system query request that comprises identifier information of the terminal device, and
a sending module, configured to send the query request to the recursive server;
wherein the message generating module comprises: a first message generating unit, configured to generate a domain name system packet, and add the identifier information of the terminal device into a packet header of the domain name system packet; or a second message generating unit, configured to generate the domain name system packet, and add the identifier information of the terminal device into data information of the domain name system packet;
the recursive server is configured to receive the domain name system query request sent by the terminal device, and forward the query request to the authority server; and
the authority server is configured to: receive the domain name system query request forwarded by the recursive server, wherein the domain name system query request comprises the identifier information of the terminal device that sends the query request; resolve the received domain name system query request to obtain the identifier information of the terminal device; and exercise query control according to the identifier information of the terminal device;
wherein the authority server is specifically configured to control query rights of the terminal device according to the identifier information of the terminal device; or statisticize number of times of query initiated by the terminal device according to the identifier information of the terminal device;
wherein the packet header of the domain name system packet and the data information of the domain name system packet are not updated when the domain name system query request is forwarded by the recursive server.

\* \* \* \* \*